United States Patent [19]
Riley et al.

[11] 3,770,617
[45] Nov. 6, 1973

[54] HYDRODESULFURIZATION WITH A SPECIFIED PORE SIZE DISTRIBUTION IN SILICA-STABILIZED ALUMINA

[75] Inventors: Kenneth L. Riley; Willard H. Sawyer, both of Baton Rouge, La.

[73] Assignee: Esso Research and Engineering Company, Linden, N.J.

[22] Filed: Dec. 28, 1970

[21] Appl. No.: 101,957

[52] U.S. Cl. .................................. 208/216, 208/217
[51] Int. Cl. ............................................. C10g 23/02
[58] Field of Search .................... 208/216, 217, 209

[56] References Cited
UNITED STATES PATENTS

| | | | |
|---|---|---|---|
| 3,630,888 | 12/1971 | Alpert et al. | 208/216 |
| 3,668,116 | 6/1972 | Adams et al. | 208/216 |
| 3,267,025 | 8/1966 | Gring et al. | 208/216 |
| 3,322,666 | 5/1967 | Beuther et al. | 208/216 |
| 3,471,399 | 10/1969 | O'Hara | 208/216 |
| 3,531,398 | 9/1970 | Adams et al. | 208/216 |

*Primary Examiner*—Delbert E. Gantz
*Assistant Examiner*—G. J. Crasanakis
*Attorney*—Pearlman & Schlager and N. Elton Dry

[57] ABSTRACT

Hydrodesulfurization of heavy feedstocks containing asphaltenes is carried out with a catalyst having an oxide or sulfide of Group VIB and/or Group VIII metal on an alumina stabilized with 0.5–6 percent silica by weight of the total catalyst. A major portion of the surface area of said catalyst is in pores ranging from 30–80 Angstroms in diameter, 0.5 to less than 4 percent of the total pore volume is in pores ranging from 200–2,000 Angstroms in diameter, and from 3.0 to 10.0 percent of the total pore volume is in pores greater than 2,000 Angstroms in diameter.

10 Claims, 1 Drawing Figure

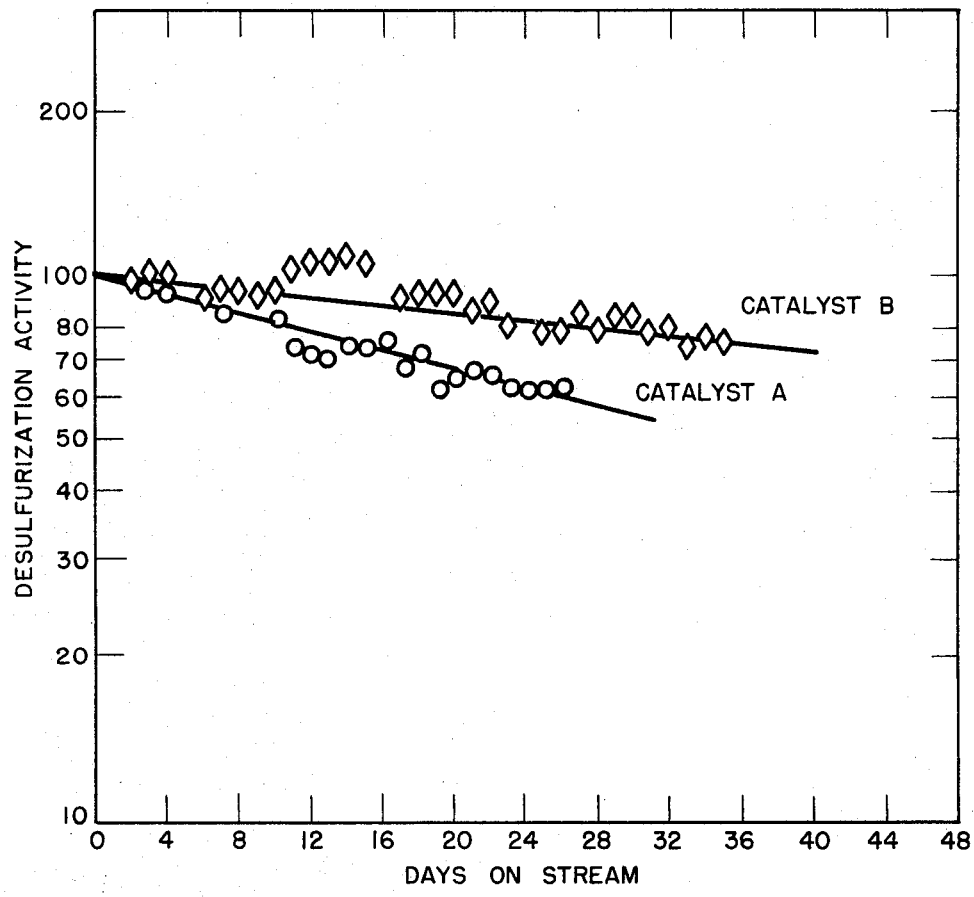

HYDRODESULFURIZATION WITH A SPECIFIED PORE SIZE DISTRIBUTION IN SILICA-STABILIZED ALUMINA

DESCRIPTION OF THE PRIOR ART

Field of the Invention

The present invention relates to an improved hydroprocessing processing catalyst and process for using same. More particularly, the invention comprises a bimodal pore size range catalyst for hydrodesulfurizing heavy feeds wherein asphaltenes are reduced as a significant factor in catalyst deactivation.

BACKGROUND OF THE INVENTION

Hydroprocessing catalysts used in hydrodesulfurization of heavy feed stocks, such as heavy gas oils, residuum, deasphalted oil stocks and the like, have been developed containing different pore size distributions. The pore size distribution of these catalysts have varied from having narrow ranges to having wide ranges. In relation to pore size ranges, surface area and pore volume have been shown to be an influencing factor.

Thus, in a recently issued patent, U.S. Pat. No. 3,509,044, it was taught that a residuum feed would be advantageously hydrodesulfurized by using a catalyst supported on a silicastabilized alumina having a major portion of the surface area residing in pores ranging from 30 to 70A in diameter.

Even though this catalyst demonstrated exceptional activity improvement over other, known hydrodesulfurization catalysts, asphaltenes present in the feed stocks continued to cause difficulty in maintaining activity over long periods of catalyst service. The asphaltenes deposit on the catalyst surface, blocking the pore openings. Even though the asphaltenes were too large to enter the pores, their deposition on the catalyst surface caused loss of catalyst life.

These difficulties have been overcome, while maintaining good catalyst activity, by the present invention which provides a novel pore size distribution allowing asphaltene lay-down without pore blocking.

SUMMARY OF THE INVENTION

The present invention comprises a novel hydroprocessing catalyst which comprises a hydrogenation component impregnated on an alumina support having a major portion (i.e., greater than 50 percent) of its surface area in pores ranging from 30–80A in diameter, with less than four (4) percent of the total pore volume being in pores ranging from 200 to 2,000A in diameter, and at least three percent of the total pore volume being in pores greater than 2,000A in diameter. The hydrogenation component is preferably a mixture of Group VIB and Group VIII metal oxides or sulfides.

The catalyst is used in a hydroprocess for removing hetero-atoms from a hydrocarbon stream comprising contacting a hydrocarbon feed, comprising heavy gas oils or residuacontaining fractions, at a pressure of from about 500 to 3,000 psig at a LHSV of from about 0.20 to 5, with hydrogen at a gas rate of from 500 to 15,000 SCF/B, in the presence of the above catalyst, at a temperature between 550° to 850°F.

DESCRIPTION OF THE DRAWING

The drawing is a graph comparing the hydrodesulfurization activity of one of the catalysts of the invention compared to that of a typical prior art catalyst.

The process feed stocks used in the present invention vary over a wide range of boiling points, but may be classified together as heavy petroleum feed stocks. That is, one of the acceptable process feed stocks is a petroleum residuum obtained from distillation or other treating or separation process. From 30–100 percent of the feed boils above 900°F. The process is designed to treat a residuum without any preprocessing; however, when the metal content of the oil is greater than 500–1,000 p.p.m. it may be necessary to employ a metals removal step such as HF treatment or solvent precipitation with propane, butane, mixtures of propane and butane, pentane, hexane or naphtha. The petroleum residuum can be a blend of high boiling materials such as atmospheric bottoms, vacuum bottoms, deasphalted oil, visbreaker products, heat soaked materials, gas oil cuts, etc. The feed stocks of the invention contain relatively large amounts of sulfur, asphaltenes, metals and ash. Some of these materials or conversion products thereof deposit on a hydrodesulfurization catalyst when hot oil is brought in contact with the catalyst surface. These residuum containing feed stocks have the following properties and inspections:

TABLE I

Properties of Petroleum Residua

| | Broad Range | Narrow Range | Feed of Ex. 2 (Tia Juana Medium Atmos. Resid.) |
|---|---|---|---|
| % 900°F. boiling above | 30–100 | 50–100 | 60 |
| Gravity, °API | −5–25 | 10–20 | 15.0 |
| Viscosity, SFS at 122°F. | 50–5,000 | +100–1,000 | 373 |
| Sulfur, wt. % | 1–8 | 2–6 | 2.19 |
| Nitrogen, wt. % | 0–1 | 0.001–0.5 | 0.35 |
| Metals (p.p.m.), total | 20–1,00 | 80–500 | 309 |
| Vanadium (p.p.m) | 10–500 | 30–300 | 273 |
| Nickel (p.p.m.) | 5–200 | 10–100 | 34 |
| Asphaltenes, wt. % | 1–20 | 2–10 | 7.5 |
| Pour Point °F. | 0–200 | 25–100 | 35 |
| Conradson Carbon, wt. % | 5–20 | 8–16 | 11.6 |

Other suitable process feed stocks are heavy petroleum distillates. The most suitable of these type feeds are gas oils such as atmospheric gas oil, vacuum gas oil, coker gas oil, and visbreaker oil. The feed can also be a blend of any of these materials and may include small quantities of other fractions such as cat cracked fractions and small quantities of residual fractions. The initial boiling point of the fraction will be in the range of from about 350° to about 700°F. The end point of the fraction will be in the range of from about 750° to about 1,300°F. The process is uniquely applicable to heavy vacuum gas oils having an initial boiling range in the range of from about 650° to about 750°F. and an end point above 1,000°F., i.e., 1,050°–1,150°F. Ordinarily the metals content of the gas oil type feed will be relatively low, i.e. from 1–50 p.p.m., preferably 0.05–10 p.p.m. metals. The gas oil will contain from 0.1 to 5.0 weight percent sulfur, some of the sulfur being in the form of thiophene-type ring compounds. The Conradson carbon of the feed will be at least 0.2 and more often at least 0.5.

The process of the invention is also applicable to a "dirty gas oil." This type of material is encountered when a vacuum distillation unit is being pushed to obtain the maximum quantity of vacuum gas oil from the crude oil or atmospheric fraction fed to the still. Because of variations in operating conditions, a large slug of residual material is occasionally carried overhead from the vacuum still and this type of material can rapidly deactivate a conventional hydrodesulfurization catalyst. The process is designed to treat a feed stock without any preprocessing other than vacuum distillation or solvent deasphalting. Typical feed stock characteristics are as shown in Table II.

TABLE II

Feed Stock Inspections

| Feed | A | B | C | D |
|---|---|---|---|---|
| Crude source & Description | Arabian Vacuum Gas Oil | Safaniya Vacuum Gas Oil | Venezuelan 850/1100°F. Vacuum Gas Oil | Venezuelande- asphalted Oil |
| Gravity, °API | 20.2 | 23.2 | 15.9 | 15.2 |
| Sulfur, Wt. % | 2.95 | 2.59 | 2.45 | 2.17 |
| Conradson Carbon, Wt. % | 0.37 | .08 | | 6.89 |
| Modified Naphtha Insolubles, Wt. % | 0.4 | | | 1.0 |
| C-H Analysis, Wt. % C | 85.20 | 85.08 | | 85.67 |
| Wt. % H | 11.79 | 12.10 | | 11.66 |
| Metals, ppm Ni | 0.3 | | 1.4 | 4 |
| Fe | | 4.5 | 24 | 2 |
| V | 0.4 | 3.1 | 3.4 | 27 |
| Viscosity at 122°F., SSF | 30.0 | | 140 | 1801 |
| at 140°F., SSF | 21.5 | | 73 | 743 |
| Flash, COC, °F. | 414 | 380 | | 605 |
| Pour Point, °F. | 87 | 80 | | 70 |
| ASTM D-1160 at 1 mm Hg IBP, °F. | | | | |
| (Atmos. Eqn.) | 555 | 542 | 787 | 828 |
| 5% | 710 | 629 | 835 | 956 |
| 10% | 772 | 685 | 847 | 991 |
| 20% | 815 | 721 | 871 | 1034 |
| 30% | 847 | 753 | 889 | |
| 40% | 857 | 781 | 907 | |
| 50% | 895 | 802 | 925 | |
| 60% | 896 | 816 | 949 | |
| 70% | 913 | 830 | 966 | |
| 80% | 931 | 846 | 995 | |
| 90% | 949 | 868 | 1036 | |
| 95% | 963 | 897 | 1047 | |
| FBP, °F. | 971 | 897 | 1047 | 1047 |
| Recovery,% | 97 | 95 | 95 | 24 |

Other suitable feed stocks which may be used with the catalyst of this invention are those normally treated in hydrorefining, such as, light catalytic gas oils, heavy coker naphtha, and visbreaker naphtha. These fractions have initial boiling points in the range of from about 100° to 350°F. and final boiling points of from 375° to 650°F. A lower boiling fraction, the visbreaker naphtha, has a typical initial boiling point of 110°F., final boiling point of 390°F., an API gravity of 60.2°, a sulfur level of 0.48 weight, percent, 9.8 ppm nitrogen and color SAY 16. This feed would be run at a temperature of about 590°F., a pressure of about 350 psig, space velocity of 1.98 V/V/Hr. and a gas rate of about 1,700 SCF/B.

As can be seen, the catalyst of the present invention has been found useful in a wide variety of hydroprocessing operations for a large variety of feed materials. Comparative run results, comparing catalyst activity maintenance are illustrated in the examples.

It has been found that the alumina base or catalyst carrier of this invention can be used as a carrier for catalysts employed in catalytic cracking, dehydrogenation, hydrogenation, hydroforming, desulfurization, denitrogenation, aromatization and reforming of hydrocarbons.

The support can be prepared by precipitating the oxides or hydrated oxides of aluminum and silicon from aqueous solutions of water salts of these metals. For example, suitable proporations of the water soluble salts of aluminum such as the sulfate, chloride or nitrate and suitable proportions of water soluble silicon salts such as a sodium silicate are precipitated from solution by adjusting the pH of the solution with acidic or basic material. The precipitate is washed and other wise treated to remove impurities as necessary. The support can be impregnated with the metals while it is wet or after drying and calcining.

A preferred method of preparing the catalyst is to treat alkaline aqueous aluminate solutions which contain predetermined amounts of silica with acidic reagents to precipitate an aluminosilicate in the hydrous form. A slurry produced by this technique is then treated by known methods to furnish a preferred catalyst support of this invention.

The supports of the types prepared above are then impregnated with metals which promote a hydrodesulfurization reaction.

The preferred alkaline aqueous aluminate solution is a solution of sodium aluminate. It is understood that other alkali metal aluminates can be used except they are not preferred from an economic standpoint.

The acidic reagents which can be used are the mineral acid salts of aluminum, e.g., aluminum halides, nitrates, and sulfates. Also useful are the well-known mineral acids themselves, e.g. hydrochloric, nitric, sulfuric acids, and the like.

The conditions for preparing the support are so controlled that the finished support has an apparent bulk density of less than 0.70 g/cc. It is further characterized as being opaque as distinguished from glassy in appearance (indicating that a large quantity of the alumina is in a crystalline form). The catalyst is extrudable.

In preparing these preferred catalytic materials the following illustrates preferred conditions.

TABLE III

| Conditions | Broad Range | Preferred Range |
|---|---|---|
| I Concentration of starting aluminate solution, expressed as $Al_2O_3$,% | 1.2–5 | 1.2–1.7 |
| II Precipitation temperature, (°F) | 105–120 | 110–120 |
| III pH | 5–9.5 | 6–9 |
| IV Reaction time, (hrs.) | ¼–6 | ¼–2 |

Using the above general reaction conditions, the support resulting from the reaction is in the form of a dilute slurry. This slurry may then be concentrated and subjected to spray drying operations at temperatures ranging between 200°–2,000°F., preferably 200°–500°F. If drying at this stage is desired, it will normally be followed by water washing to remove the excess alkali metal ions and sulfate ions. The support can then be impregnated with the catalytic metals and extruded or pilled or otherwise formed into any desired physical form.

If drying at this stage is not desired, the hydrated oxide of aluminum and silicon can then be washed to remove soluble impurities. The hydrated oxide is then (1) dried, impregnated, extruded, and calcined, or (2) impregnated, extruded, and calcined, or (3) dried, extruded, dried or calcined, impregnated, and calcined.

The aforementioned silica-alumina hydrogels can be composited with other synthetic and/or semi-synthetic aluminas, silica gels, and/or other silica-alumina-clay hydrogel compositions for the purpose of adjusting the alumina and/or silica present during impregnation. In general, the silica content of the catalyst should be maintained in the range of 1–6 weight percent, preferably 0.5–5 weight percent. The resulting catalyst, when calcined, should have a total surface area greater than 150 m.²/g. as measured by the BET procedure with nitrogen, and the pore volume is preferably greater than 0.25 cc/g. The alumina base can also have incorporated therewith, besides silica, zirconia, titania, iron oxide, and/or thoria.

The active metallic components in the finished catalyst are a Group VI–B salt, specifically a molybdenum salt or tungsten salt selected from the group consisting of molybdenum oxide, molybdenum sulfide, tungsten oxide, tungsten sulfide, and mixtures of these and a Group VIII salt, specifically a nickel or cobalt salt selected from the group consisting of nickel oxide, cobalt oxide, nickel sulfide and cobalt sulfide and mixtures of these. The preferred active metal salts are nickel oxide with molybdenum oxide and cobalt oxide with molybdenum oxide. Oxide catalysts are preferably sulfided prior to use.

The final catalyst contains the following amounts of each component.

TABLE IV

| | Broad range (wt. %) | Preferred range (wt. %) |
|---|---|---|
| Nickel or cobalt (as oxide) | 1–15 | 2–10 |
| Tungsten or molybdenum (as oxide) | 5–25 | 10–20 |
| Silica | 1–6 | 1.5–5 |
| Alumina | 93–52 | 86–64 |

Catalysts having good activity and activity maintenance for hydrodesulfurization of heavy petroleum feed stocks can be characterized as having high surface area in the 30–70 A pore diameter range, as taught in U.S. Pat. No. 3,509,044. The pore volume distribution in the small pores of the catalysts as defined by this invention is measured by nitrogen adsorption isotherm where the volume of nitrogen adsorbed is measured at various pressures. This technique is described in Ballou et al., Analytical Chemistry, Vol. 32, Apr. 1960, pp. 532–536. The pore diameter distributions for the examples of the invention were obtained using a Model No. 4–4680 Adsorptomat manufactured by the American Instrument Company, Silver Spring, Maryland. The pore volume distribution in the large pores was measured using a Mercury Porosimeter.

The large pore diameter distributions for the examples of the invention were obtained using a Model No. 5–7119 Porosimeter manufactured by the American Instrument Co., Silver Spring, Maryland. This technique is described by Winslow and Shapiro in "An Instrument for the Measurement of Pore-size Distribution by Mercury Penetration," ASTM Bulletin, Feb. 1959. One skilled in the art can select catalyst manufacturing process steps and process conditions within the specific ranges disclosed herein to prepare catalysts having the required pore diameter, pore size distribution, pore volume, and surface area.

The catalyst of the present invention is a distinct improvement over the catalyst disclosed in U.S. Pat. No. 3,509,044 by virtue of the significant activity maintenance improvement over the catalyst of the patent, (see the drawing herein for comparison of activity maintenance of the catalyst disclosed therein with the catalyst of the present invention.)

The desired, novel pore size distribution is obtained by carefully selecting a certain distribution of particle sizes before forming the material into an extrudate or tablet. Generally, the particle sizes should fall within the amounts shown in Table V, below:

TABLE V

Bimodal Particle Size Distribution

| U.S. Sieve Series Mesh Size | Particle Size (1) Microns | Mass Fraction Retained, Wt. % | Percentage % (2) |
|---|---|---|---|
| +40 | +420 | 25.6 | <20 |
| −40 + 100 | −420 + 149 | 14.6 | >15 |
| −100 + 325 | −149 + 44 | 53.1 | <50 |
| −325 (3) | −44 | 6.7 | >10 |

(1) The numbers refer to particles that either pass through or are retained on the screens. A (−) sign indicates that the particles pass through and are retained (+) on the next size screen.
(2) These are the preferred ranges of particles in the catalyst support.
(3) The particles in this range are referred to as "fines."

The pore volume distribution in 200–2000A diameter pores and in pores of greater than 2,000A diameter is obtained by controlling particle size distribution as shown in Table V. It is believed that the less than 15 percent of particles in −420 + 149 particle size range is necessary to provide a minimum of pore volume in the 200–2,000A diameter pore range. Up to 10 percent of the particles can be classified as "fines," that is, pass through the 325 mesh screen (and are less than 44 microns in diameter).

The bimodal nature of the composite catalyst of the present invention contributes to the extremely good activity maintenance achieved using the catalysts in typical hydroprocessing reactions. Typical applications for which these catalysts have been found useful are hydrofining, hydrodesulfurization, hydrodenitrogenation, and the like. The catalysts are particularly useful in hydrodesulfurization of gas oils and residua-containing hydrocarbon feed stocks.

It was shown in U.S. Pat. No. 3,509,044 that a catalyst, as disclosed therein, having a major portion of its surface area in pores having diameters ranging from 30–70A, a surface area in these pores of from 100–300 m²/g, would provide excellent activity and activity maintenance over known catalyst compositions.

The present invention lies in the discovery that initial activity can be achieved which is comparable to that composition's activity, with the distinct advantage of having a greatly improved activity maintenance over the useful life of the catalyst of this invention. The improved activity maintenance is achieved by not only having a major portion of the surface area in pores ranging from 30–70A or 30–80A diameter, but by limiting the pore volume in pores ranging from 200–2,000A diameter to less than about four (4) percent.

Thus, the novel hydroprocessing catalyst of the invention comprises a hydrogenation component impregnated on an alumina-type support having a major portion (i.e., greater than 50 percent) of its surface area in pores ranging from 30–80A in diameter, with less than four (4) percent of the total pore volume being in pores ranging from 200–2,000A in diameter, and at least three (3) percent of the total pore volume being in pores greater than 2,000A in diameter.

This is in direct contrast to teachings by others that a wide pore size distribution is important for hydrodesulfurization of heavy feed stocks. It has been found that the wide pore size distribution leads to relatively fast deactivation of the catalyst because of a minimum of the surface area and pore volume being in the critical pore size ranges. The provision of a moderate amount of the pore volume being in pores greater than 2,000A in diameter provides access to a multiplicity of active catalyst sites within the 30–80A diameter range of pores. These sites are less apt to become plugged by the metals and asphaltenes present in the heavier feeds. In the lighter, hydrorefining feed stocks, the useful life of the catalyst is greatly extended as a result of the novel pore size distribution claimed herein.

These applications are better understood by reference to the following examples:

EXAMPLE 1

The following illustrates a typical catalyst preparation for the present invention.

Three solutions are prepared, e.g., A, B, and C:

| | Ingredient | Amount |
|---|---|---|
| Solution A [1] | Water | 36 gallons |
| | Sodium silicate solution 28% $SiO_2$ | 113 cc. |
| | Sodium aluminate 23.5% $Al_2O_3$ solution | 5323 cc. |
| | 48% gluconic acid solution | 76 cc. |
| Solution B | 98% $H_2SO_4$ | 850 cc. into 4.5 gal. $H_2O$ |
| Solution C | 9.5% alum. solution | 3.3 gallons |

[1] Total $Al_2O_3$ in solution — 1.3%

Solution B is added to solution A over a period of 23 minutes. At this point the temperature of the reaction mixture is 118°F.

Solution C is then added to the mineral acid solution over a 19 minute period. The temperature during addition remains at 118°F. The final pH, after the above additions, is 8.8. The slurry is filtered, reslurried, spray dried, washed to remove soluble salts, and redried. The support material has been impregnated with (dry weight basis) 3.5 percent cobalt oxide and 12.0 percent molybdenum oxide (1.7percent $SiO_2$, and the balance alumina).

The dry catalyst is screened in order to separate the powder into the particle size ranges listed in Table V. The particles are blended together in proportions containing the minimum and maximum amounts shown therein. This catalyst will be referred to hereinafter as Catalyst B.

EXAMPLE 2

Side-by-side comparative runs were made in a pilot plant to give a direct comparison of activity decline between the catalyst disclosed in U.S. Pat. No. 3,509,044 and the catalyst of the present invention.

Both catalysts were calcined overnight at 700°F. and then sulfided using the Safaniya vacuum gas oil described in Table II. Sulfiding was carried out at a liquid hourly space velocity of 1 V/VHr., 1,500 psig, 1,500 s.c.f. $H_2$/b. and 630°F. After about seven days on oil the temperature was raised to near 700°F. and feed was cut in. The feed stock was a Tia Juana Medium atmospheric residuum having the properties set forth in Table I. Side-by-side comparative runs were then made with a pressure of 1,500 psig, a space velocity of 1 V/V/Hr., and a hydrogen rate of 3,000 s.c.f./b. Since previous data had indicated that the hydrodesulfurization of the particular feed stock followed a second-order kinetic rate expression, rate constants were calculated for the desulfurization occurring in each test.

To emphasize the observed difference in activity maintenance the desulfurization activity for each catalyst shown as a function of time on oil in the drawing was calculated as 100 times the ratio of the observed rate constant for the reaction divided by the initial rate constant. Because of this approach, both catalysts will therefore show an initial activity of 100 in the figure. Notice that after 28 days Catalyst B, the catalyst of the present invention, has retained about 80 percent of its initial activity whereas Catalyst A, disclosed in U.S. Pat. No. 3,509,044 has only retained about 57 percent of its initial activity.

The advantage of this improved activity maintenance is further shown by the observation that during the first five days of the test Catalyst A was found to be at least 35 percent more active than Catalyst B, the catalyst of the present invention. However, after about 22 days on oil both catalysts showed the same desulfurization activity. From this point on Catalyst B became increasingly more active relative to Catalyst A.

The physical properties of the two catalysts are shown in Table VI, below:

TABLE VI

Particle Size Distribution

| Size range (microns) | Catalyst (A) | Catalyst (B) |
|---|---|---|
| +420 | 3.1 | 25.6 |
| −420 + 149 | 5.5 | 14.6 |
| −149 + 44 | 53.2 | 53.1 |
| −44 | 38.2 | 6.7 |
| Total | 100.0 | 100.0 |
| Surface area, m²/g. | 3.2 | 350 |
| Pore Volume, cc./g. | 0.49 | 0.44 |
| Surface area in 30–80A diameter pore size range, m²/g. | 247 | 272 |
| Pore Volume in 30–80A diameter pore size range, cc/g | 0.33 | 0.32 |
| Pore Volume in 200–2000A diameter pore size range, cc/g. | 0.020 | .004 |
| Pore Volume in pores with diameters greater than 2000A, cc/g. | 0.006 | 0.018 |

Notice that Catalyst A has less than 1 percent of its pore volume in pores with diameters greater than 2,000A and greater than 4 percent of its pore volume in pores with diameters between 200 and 2,000A. However, Catalyst B, the catalyst prepared in Example 1, is characterized by a very low percentage of its pore volume in pores with diameters between 200 and 2,000A and an appreciable amount of pore volume in pores with diameters greater than 2,000A. For example, Catalyst B has less than 1 percent of its pore volume between 200 and 2,000A and greater than 4 percent of its pore volume in pores greater than 2,000A.

EXAMPLE 3

A small pilot plant unit containing 60 cc. of catalyst was used in this example. The oil was passed down through the catalyst bed.

Another catalyst was prepared using conditions similar to those taught in U.S. Pat. No. 3,509,044 making no attempt to alter the particle size distribution of the impregnated powder before extrusion. The pore size distribution of the catalyst, called Catalyst C, is given in the following table:

TABLE VII

| | |
|---|---|
| Surface area, m²/g. | 323 |
| Pore Volume, cc./g. | 0.54 |
| Surface area in 30–80A diameter pore size range, m²/g. | 203 |
| Pore volume in 30–80A diameter pore size range, cc./g. | 0.25 |
| Pore volume in 200–2,000A diameter pore size range, cc./g. | 0.08 |
| Pore volume in pores with diameters greater than 2,000A, cc./g. | 0.001 |

Note that Catalyst C has less than 2 percent of its pore volume in pores with diameters greater than 2,000A and almost 15 percent of its pore volume in pores with diameters between 200 and 2,000A.

Both Catalyst C and Catalyst B (prepared in Example 1), the catalyst disclosed in our invention, were calcined for 3 hours at 1,000°F. before charging to the unit. A volume of 60 cc. of each catalyst was charged to the unit and a side-by-side comparison was made for vacuum gas oil hydrodesulfurization activity. Catalyst sulfiding was accomplished by using a Safaniya vacuum gas oil (properties given in Table II) at 1,500 psig, 635°F. 1 V/V/Hr., and 1,500 s.c.f. $H_2$/b. After sulfiding, activity measurements were made with this feedstock. At these process conditions Catalyst C gave 78 percent sulfur removal; however, Catalyst B, disclosed in our invention, gave a sulfur removal of 84 percent. This clearly shows the advantages of using the catalyst disclosed in our invention for the hydrodesulfurization of vacuum gas oils

What is claimed is:

1. A process for the desulfurization of a sulfur-containing petroleum hydrocarbon feed comprising contacting said feed, in the presence of hydrogen, at a pressure ranging between 500–3,000 psig, LHSV of from about 0.20 to 5, and a gas rate of from 500 to 16,000 SCF/B with a catalyst comprising an oxide or sulfide of a Group VIB or Group VIII metal on an alumina support, said alumina being stabilized with from 0.5 to 6 percent silica based on the weight of the total catalyst, said catalyst having a major portion of its surface area in pores ranging from 30–80A in diameter, with from 0.1 to less than about 4 percent of the total pore volume being in pores ranging from 200 to 2,000A in diameter, and from 3.0 to 10.0 percent of the total pore volume being in pores greater than 2,000A in diameter.

2. The process of claim 1 wherein the alumina support is stabilized with from 0.5–2.5 weight percent silica, based on the total cayalyst.

3. A hydrodesulfurization process according to claim 1, wherein said catalyst comprises a mixture of the oxide or sulfide of a Group VIB metal with the oxide or sulfide of a Group VIII metal on said alumina support, the total weight of said mixture being present in an amount ranging from about 10 to about 20 weight percent, based on total catalyst.

4. A hydrodesulfurization process according to claim 3, wherein said catalyst comprises a mixture of the oxide or sulfide of a metal selected from the group consisting of nickel and cobalt with the oxide or sulfide of a metal selected from the group consisting of molybdenum and tungsten.

5. A hydrodesulfurization process according to claim 1, wherein said oxide or sulfide is impregnated on an alumina, having from 0.5–6 weight precent silica based on the weight of the total catalyst, and wherein a major portion of its surface area is in pores ranging from 30–80A in diameter, with from 0.1 to 1.0 percent of the total pore volume being in pores of from 200–2,000A in diameter, and from 3.0 to 10.0 percent of the total pore volume is in pores greater than 2,000A in diameter.

6. The process of claim 5 wherein said catalyst comprises from about 2 to 5 weight percent CoO and from 8 to 15 weight percent $MoO_3$, based on total catalyst.

7. The process of claim 1, wherein the hydrocarbon feed comprises a gas oil having a boiling range of from about 650°F. up to about 1,150°F.

8. The process of claim 1, wherein the hydrocarbon feed comprises a petroleum residuum wherein from 30–100 percent of said feed boils above 900°F.

9. The process of claim 1 wherein the petroleum hydrocarbon feed is a residuum, 30 to 100 Wt. percent of which boils above about 900°F., contains 1–8 Wt. percent sulfur, 1–20 Wt. percent asphaltenes, and greater than about 500–1,000 ppm metals.

10. The process of claim 1 wherein the petroleum hycrocarbon feed is a heavy distillate, the initial boiling point of which is in the range of from about 350°F. to about 1,150°F.

* * * * *